United States Patent
Ma

(10) Patent No.: US 9,891,073 B2
(45) Date of Patent: Feb. 13, 2018

(54) METHOD AND DEVICE FOR PROVIDING GUIDANCE TO STREET VIEW DESTINATION

(71) Applicant: TENCENT TECHNOLOGY (SHENZHEN) COMPANY LIMITED, Shenzhen, Guangdong (CN)

(72) Inventor: Teng Ma, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 0 days.

(21) Appl. No.: 15/160,654

(22) Filed: May 20, 2016

(65) Prior Publication Data

US 2016/0265935 A1   Sep. 15, 2016

Related U.S. Application Data

(63) Continuation of application No. PCT/CN2015/080735, filed on Jun. 4, 2015.

(30) Foreign Application Priority Data

Jun. 5, 2014 (CN) .......................... 2014 1 0247087

(51) Int. Cl.
*G01C 21/26* (2006.01)
*G01C 21/36* (2006.01)
(Continued)

(52) U.S. Cl.
CPC ....... *G01C 21/3697* (2013.01); *G01C 21/165* (2013.01); *G01C 21/3423* (2013.01);
(Continued)

(58) Field of Classification Search
CPC ............ G01C 21/3697; G01C 21/3423; G01C 21/3679; G01C 21/3647; G01C 21/3605;
(Continued)

(56) References Cited

U.S. PATENT DOCUMENTS

| 7,697,827 B2 * | 4/2010 | Konicek | ................ | G03B 17/02 348/211.1 |
| 8,401,785 B2 * | 3/2013 | Cho | ................... | G01C 21/3602 340/995.24 |

(Continued)

FOREIGN PATENT DOCUMENTS

| CN | 101794316 A | 8/2010 |
| CN | 101825466 A | 9/2010 |

(Continued)

OTHER PUBLICATIONS

Julier et al.; Information filtering for mobile augmented reality; Augmented Reality, 2000 (ISAR 2000); IEEE; Oct. 2000; p. 3-11.*

(Continued)

*Primary Examiner* — Michael J Zanelli
(74) *Attorney, Agent, or Firm* — Baker & Hostetler LLP

(57) ABSTRACT

Disclosed is a method and device for providing guidance to a street view destination. The method includes: acquiring a real scenario image of a scenario in which a device is located; determining, according to a current location and a device facing direction of the device, annotated information needing to be displayed; displaying, in the real scenario image, the annotated information needing to be displayed; determining selected annotated information; and displaying detailed information of a street view corresponding to the selected annotated information.

20 Claims, 10 Drawing Sheets

(51) Int. Cl.
| | | |
|---|---|---|
| *G01C 21/16* | (2006.01) | |
| *G01C 21/34* | (2006.01) | |
| *G01S 19/42* | (2010.01) | |
| *G06F 3/01* | (2006.01) | |
| *G06F 3/0484* | (2013.01) | |
| *G06F 3/16* | (2006.01) | |
| *G06F 17/24* | (2006.01) | |
| *G06T 11/60* | (2006.01) | |

(52) U.S. Cl.
CPC ..... *G01C 21/3605* (2013.01); *G01C 21/3647* (2013.01); *G01C 21/3679* (2013.01); *G01S 19/42* (2013.01); *G06F 3/013* (2013.01); *G06F 3/017* (2013.01); *G06F 3/04842* (2013.01); *G06F 3/167* (2013.01); *G06F 17/241* (2013.01); *G06T 11/60* (2013.01)

(58) Field of Classification Search
CPC ... G01C 21/165; G06T 11/60; G06F 3/04842; G06F 3/167; G06F 3/017; G06F 3/013; G06F 17/241; G01S 19/42
See application file for complete search history.

(56) References Cited

U.S. PATENT DOCUMENTS

| | | | | |
|---|---|---|---|---|
| 8,467,991 | B2* | 6/2013 | Khosravy | G01C 21/20 |
| | | | | 702/153 |
| 2010/0225756 | A1* | 9/2010 | Miyata | G01C 21/3602 |
| | | | | 348/116 |
| 2010/0268451 | A1* | 10/2010 | Choi | G01C 21/3602 |
| | | | | 701/533 |
| 2011/0071757 | A1 | 3/2011 | Lee | |
| 2011/0187744 | A1 | 8/2011 | Kim | |
| 2011/0199479 | A1* | 8/2011 | Waldman | G01C 21/3602 |
| | | | | 348/116 |
| 2013/0093787 | A1* | 4/2013 | Fulks | G06T 11/60 |
| | | | | 345/629 |
| 2013/0286206 | A1 | 10/2013 | Ozaki et al. | |
| 2013/0342574 | A1* | 12/2013 | Tseng | G01C 21/3611 |
| | | | | 345/633 |
| 2016/0240011 | A1* | 8/2016 | Fedosov | G06T 19/006 |
| 2016/0298981 | A1 | 10/2016 | Miyata | |

FOREIGN PATENT DOCUMENTS

| | | |
|---|---|---|
| CN | 102123194 A | 7/2011 |
| CN | 102142005 A | 8/2011 |
| CN | 202043177 U | 11/2011 |
| CN | 102338639 A | 2/2012 |
| CN | 102607566 A | 7/2012 |
| CN | 102951089 A | 3/2013 |
| CN | 202814409 U | 3/2013 |
| CN | 104596523 A | 5/2015 |
| EP | 2228625 A2 | 9/2010 |
| JP | 2010210257 A | 9/2010 |
| JP | 2011215412 A | 10/2011 |
| JP | 2012167970 A | 9/2012 |

OTHER PUBLICATIONS

International Search Report in international application No. PCT/CN2015/080735, dated Sep. 11, 2015.
English Translation of the Written Opinion of the International Search Authority in international application No. PCT/CN2015/080735, dated Sep. 11, 2015.
English translation of the Notification of the First Office Action of Chinese application No. 201410247087.2 , dated Jul. 19, 2017.
Notification of the First Office Action of Japanese application No. 2016-570310, dated Sep. 4, 2017.

* cited by examiner

_US 9,891,073 B2_

METHOD AND DEVICE FOR PROVIDING GUIDANCE TO STREET VIEW DESTINATION

CROSS REFERENCE TO RELATED APPLICATIONS

This is a continuation application of International Patent Application No. PCT/CN2015/080735, filed on Jun. 4, 2015, which claims priority to Chinese Patent Application No. 201410247087.2 filed on Jun. 5, 2014, the disclosures of which are incorporated by reference herein in their entirety.

FIELD OF THE TECHNOLOGY

The present disclosure relates to the field of Internet technologies, and in particular, to a method and device for providing guidance to a street view destination.

BACKGROUND OF THE DISCLOSURE

In some scenarios, guidance to a street view destination is mainly provided by means of user search, that is, search for and guidance to a destination are provided according to a keyword entered by a user, or provided by pushing a topic, that is, various street view topics such as boutique hotels and popular scenic spots are actively pushed to a user, and guidance is provided according to a selection of the user.

In the guiding manner of user search, guidance needs to be provided based on user input, which is inconvenient for use. In the guiding manner of topic pushing, a pushed topic may be a topic in which a user is not interested or that is not needed by a user, which may have an undesirable actual effect and is not well targeted.

SUMMARY

Embodiments of the present invention disclose a method and electronic device for providing guidance to a street view destination, which can efficiently and conveniently implement guidance to a street view destination in a targeted manner.

An aspect of the embodiments of the present invention discloses a method for providing guidance to a street view destination, including:

acquiring a real scenario image of a scenario in which a device is located;

determining, according to a current location and a device facing direction of the device, annotated information needing to be displayed; and displaying, in the real scenario image, the annotated information needing to be displayed; and determining selected annotated information; and displaying detailed information of a street view corresponding to the selected annotated information.

Another aspect of the embodiments of the present invention discloses an electronic device for providing guidance to a street view destination, including:

an acquiring module, configured to acquire a real scenario image of a scenario in which the device is located;

a first determining module, configured to determine, according to a current location and a device facing direction of the device, annotated information needing to be displayed;

a second determining module, configured to determine selected annotated information; and a display module, configured to display, in the real scenario image, the annotated information needing to be displayed; and display detailed information of a street view corresponding to the selected annotated information.

BRIEF DESCRIPTION OF THE DRAWINGS

To describe the technical solutions of the embodiments of the present invention more clearly, the following briefly introduces the accompanying drawings required for describing the embodiments or the existing technology. Apparently, the accompanying drawings in the following description show only some embodiments of the present invention, and persons of ordinary skill in the art may still derive other drawings from these accompanying drawings without creative efforts.

DESCRIPTION OF EMBODIMENTS

To enable persons skilled in the art to better understand the technical solutions provided in embodiments of the present invention, the following briefly describes some technical terminologies involved in the technical solutions provided in the embodiments of the present invention.

Augmented reality (AR): Virtual objects, scenarios, or system prompt information generated by a computer is overlaid on a real scenario, so as to augment reality and enhance perception of a user on the real world. Connection between a user and the real world is not broken, and virtual objects are displayed before the eyes of the user; therefore, information can be acquired more conveniently, and interaction with an object becomes more natural.

Spatial positioning and gesture determining technology: It is ensured that virtual information overlaid in augmented reality is associated with a movement or gesture of a user in spatial positioning. When a user turns or moves, the field of view changes. Accordingly, augmented information generated by a computer changes, and the information is displayed in a correct location of the display screen in real time.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present disclosure.

Figure 1:
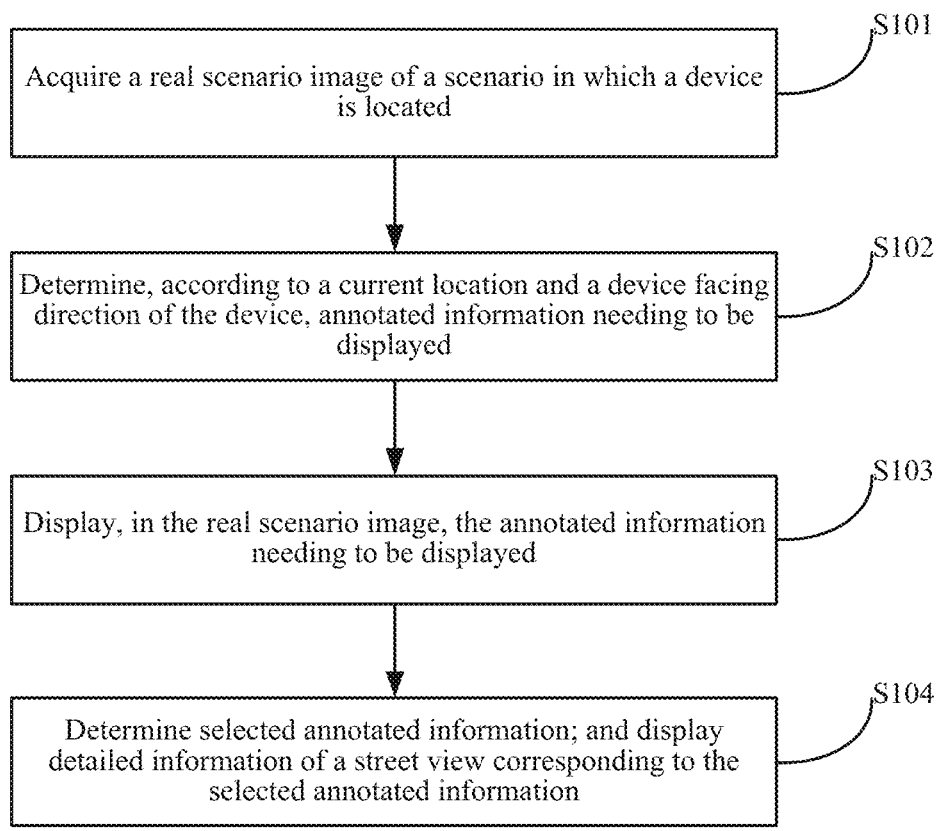
FIG. 1 is a schematic flowchart of a method for providing guidance to a street view destination according to an embodiment of the present invention.

Refer to FIG. 1, which is a schematic flowchart of a method for providing guidance to a street view destination according to an embodiment of the present invention. The method may include.

S101: Acquire a real scenario image of a scenario in which an electronic device (hereinafter referred as "device") is located.

In this embodiment of the present invention, the real image of the scenario in which the device is located may be acquired by using a camera of the device, and the real image is displayed on a display screen of the device.

S102: Determine, according to a current location and a device facing direction of the device, annotated information needing to be displayed.

In this embodiment of the present invention, the current location of the device may be determined by using a global positioning system (GPS) positioning apparatus, and the device facing direction of the device may be determined by using a sensor, where the sensor may include, but is not limited to, an accelerometer, a gyroscope, an electronic compass, and the like.

Specifically, after the current location and the device facing direction of the device are determined, annotated information corresponding to the current location and the device facing direction of the device may be further acquired, filtering on the acquired annotated information is performed according to a preset policy for filtering out annotated information, and it is determined that annotated information obtained after the filtering is the annotated information needing to be displayed.

When the annotated information corresponding to the current location and the device facing direction of the device is acquired, an annotated information database may be searched according to the current location and the device facing direction of the device, so as to acquire the corresponding annotated information. Annotated information in the annotated information database may be manually collected in advance. For example, if the current location of the device is a longitude xx and a latitude xx, and a current facing direction of the device is due north, the annotated information corresponding to the current location and the device facing direction of the device may be shopping malls, hotels, cinemas, and the like due north of the location of the longitude xx and the latitude xx.

After the annotated information corresponding to the current location and the device facing direction of the device is acquired, filtering on the acquired annotated information may be performed according to the preset policy for filtering out annotated information. The policy for filtering out annotated information may be set by a user in advance. For example, filtering may be performed according to types (for example, life services, scenic spots, and shopping) of real scenarios corresponding to the annotated information. For example, it is set that only the life service type (which may be hotels, delicious food, exercise, cinemas, supermarkets/convenience stores, and the like) is displayed, or that one or more of only hotels, delicious food, exercise, and the like are displayed. Filtering may also be performed according to distances from real scenarios corresponding to the annotated information to the current location of the device, for example, within 5 km, 1 km, 500 m, and the like. Certainly, filtering may also be performed according to other filtering policies, for example, filtering is performed according to both types and distances.

S103: Display, in the real scenario image, the annotated information needing to be displayed.

In this embodiment of the present invention, after the real scenario image of the scenario in which the device is located is acquired, and the annotated information needing to be displayed is determined, the annotated information needing to be displayed may be displayed in the real scenario image.

Specifically, after the real scenario image of the scenario in which the device is located is acquired, and the annotated information needing to be displayed is determined, the annotated information needing to be displayed and the real scenario image may be displayed on the display screen of the device in an overlaid manner, which may be specifically implemented by using an augmented reality technology.

Preferably, in this embodiment of the present invention, a target area may be set on the display screen of the device. When the annotated information needing to be displayed and the real scenario image are displayed on the display screen of the device in an overlaid manner, annotated information in the target area and a real scenario corresponding to the annotated information may be displayed in an emphasized manner (for example, highlighted, or displayed by performing magnification in a proportion).

When the user moves the device, the real scenario image displayed on the display screen of the device changes. Accordingly, a display location in which annotated information is displayed on the screen also changes as the device moves, which may be specifically implemented by using a spatial positioning and gesture determining technology.

It should be noted that in this embodiment of the present invention, when only one piece of annotated information appears in the target area, it is determined that the annotated information is annotated information in the target area, and the annotated information and a real scenario corresponding to the annotated information are displayed in an emphasized manner. When multiple pieces of annotated information appear in the target area, one piece of annotated information may be selected according to a preset rule, and it is determined that the annotated information is annotated information in the target area; and the annotated information and a real scenario corresponding to the annotated information are displayed in an emphasized manner. For example, distances from annotated information appearing in the target area to the center of the target area may be separately counted, and it is determined that annotated information nearest to the central point of the target area is the annotated information in the target area. Annotated information with a highest weight may also be selected according to weights of the annotated information (where a weight of each annotated information may be preset) appearing in the target area, and it is determined that the annotated information is the annotated information in the target area. One piece of annotated information among the annotated information appearing in the target area may also be randomly selected, and it is determined that the annotated information is the annotated information in the target area. Certainly, it is determined in other manners that one piece of annotated information among the annotated information appearing in the target area may also be the annotated information in the target area (for example, a priority of each annotated information may be preset, and when multiple pieces of annotated information appear in the target area, it is determined that one piece of annotated information with the highest priority is the annotated information in the target area), and a specific manner thereof is not enumerated herein again.

S104: Determine selected annotated information; and display detailed information of a street view corresponding to the selected annotated information.

In this embodiment of the present invention, after the annotated information needing to be displayed is displayed in the real scenario image, for the selected annotated information, the detailed information of the street view corresponding to the selected annotated information may be displayed.

Specifically, when the target area is set on the display screen of the device, the selected annotated information may be determined in at least the following manners:

Manner 1: When it is detected that a user clicks on annotated information, it is determined that the annotated information that the user clicks on is the selected annotated information.

In this manner, the user may send an annotated information selection instruction to the device by clicking on the annotated information displayed on the screen, and when it is detected that the user clicks on the annotated information, it is determined that the annotated information that the user clicks on is the selected annotated information.

Manner 2: When it is detected that a time for which annotated information in a target area stays in the target area exceeds a threshold, it is determined that the annotated information is the selected annotated information.

In this manner, the user may move, to the target area by moving the device, the annotated information that the user intends to select, and it is ensured that the time for which the annotated information stays in the target area exceeds the threshold (which may be preset, and is, for example, 2 s). When the device detects that the time for which the annotated information in the target area stays in the target area exceeds the threshold, the device determines that the annotated information in the target area is the selected annotated information.

Manner 3: When it is detected that a user rocks the device, it is determined that annotated information in a target area is the selected annotated information.

In this manner, the user may change annotated information in the target area by moving the device, and when the user determines that current annotated information in the target area is the annotated information that the user intends to select, the user may send, to the device by rocking the device, an instruction for selecting the annotated information in the target area. When the device detects that the user rocks the device, the device determines that the annotated information in the target area is the selected annotated information.

In this manner, the detecting, by the device, that the user rocks the device may be specifically: detecting that the user rocks a mobile phone according to a preset rule, which is, for example, that rocking is upward and downward (left and right, or forward and backward) and times exceed a threshold (or a rocking time exceeds a threshold).

Manner 4: When it is detected by using an eye tracking technology that a time for which a user stays on annotated information exceeds a threshold (which may be preset, and is, for example, 2 s), it is determined that the annotated information is the selected annotated information.

In this manner, the user may select the annotated information by gazing, for a time exceeding a preset time, at the annotated information that the user intends to select, and when the device detects by using the eye tracking technology that the time for which the user (the eyeballs of the user) stays on the annotated information exceeds the threshold, the device determines that the annotated information is the selected annotated information.

Manner 5: When it is detected, by means of speech recognition, annotated information input by a user by using voice, it is determined that the annotated information is the selected annotated information.

In this manner, the user may select, by means of voice input, the annotated information that the user intends to select. When the user intends to select annotated information, the user may directly input the annotated information (that is, read the annotated information) by using voice. When the device detects, by means of speech recognition, the annotated information input by the user by using voice, the device determines that the annotated information is the selected annotated information.

In a case in which no target area is set on the display screen of the device, the user may also send an annotated information selection instruction to the device by clicking on annotated information that the user intends to select, and when the device detects that the user clicks on the annotated information, the device determines that the annotated information that the user clicks on is the selected annotated information. Alternatively, the user may select annotated information by gazing at the annotated information, and when the device detects by using the eye tracking technology that a time for which the user stays on the annotated information exceeds a threshold, the device determines the annotated information as the selected annotated information. Alternatively, the user may also select, by means of voice input, annotated information, and when the device detects the annotated information input by the user by using voice, the device determines that the annotated information is the selected annotated information.

In this embodiment of the present invention, after the selected annotated information is determined, the detailed information of the street view corresponding to the selected annotated information may be displayed. For example, a detail page of the street view corresponding to the selected annotated information is displayed. The detail page may include, but is not limited to, information such as a street view thumbnail, address details, a contact number, and a distance (a distance from the street view destination to the current location).

The user may view a street view panorama by clicking on the street view thumbnail on the detail page. Accordingly, the device may display the corresponding street view panorama when the device detects that the user clicks on the street view thumbnail on the detail page, so that the user better views a corresponding street view.

Further, in the technical solution in this embodiment of the present invention, a function of planning (navigating) a path to the street view destination may be further provided. For example, a "path planning" ("navigation" or "setting as a destination") option is set on a street view detail page, and the user may query a plan of a path from the current location to the street view destination by clicking on the option.

Accordingly, the device may determine an optimal route from the current location to the street view destination when the device receives a request for planning a path to the street view destination, where the optimal route may include one or more of an optimal walking route, an optimal route for a public transportation tool, and an optimal route for a non-public transportation tool.

It should be noted that in the technical solution provided in this embodiment of the present invention, the annotated information may include, but is not limited to, one or more pieces of information such as point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance. The user can better select the street view destination according to the annotated information and need of the user.

In this embodiment of the present invention, the device for providing guidance to the street view destination may be a terminal device such as a smart phone, a tablet computer, a personal digital assistant (PDA), or a mobile Internet device (MID) that has a camera.

Figure 2:
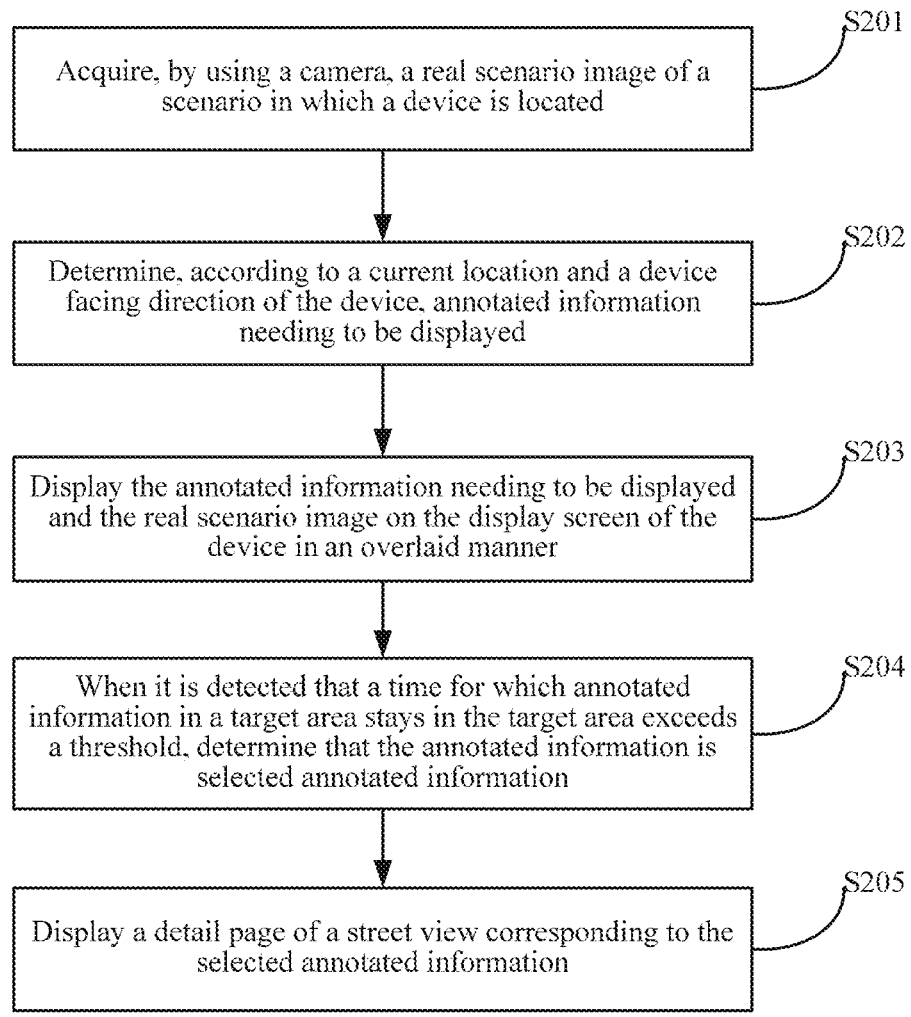
FIG. 2 is a schematic flowchart of another method for providing guidance to a street view destination according to an embodiment of the present invention.

Referring to FIG. 2, FIG. 2 is a schematic flowchart of a method for providing guidance to a street view destination according to an embodiment of the present invention. In the method for providing guidance to a street view destination shown in FIG. 2, the technical solution provided in this embodiment of the present invention is described by using an example in which a device for providing guidance to the street view destination is a smart phone (mobile phone for short) with a camera. The method for providing guidance to a street view destination shown in FIG. 2 may include the following steps.

S201: Acquire, by using a camera, a real scenario image of a scenario in which a device is located.

Figure 3A:
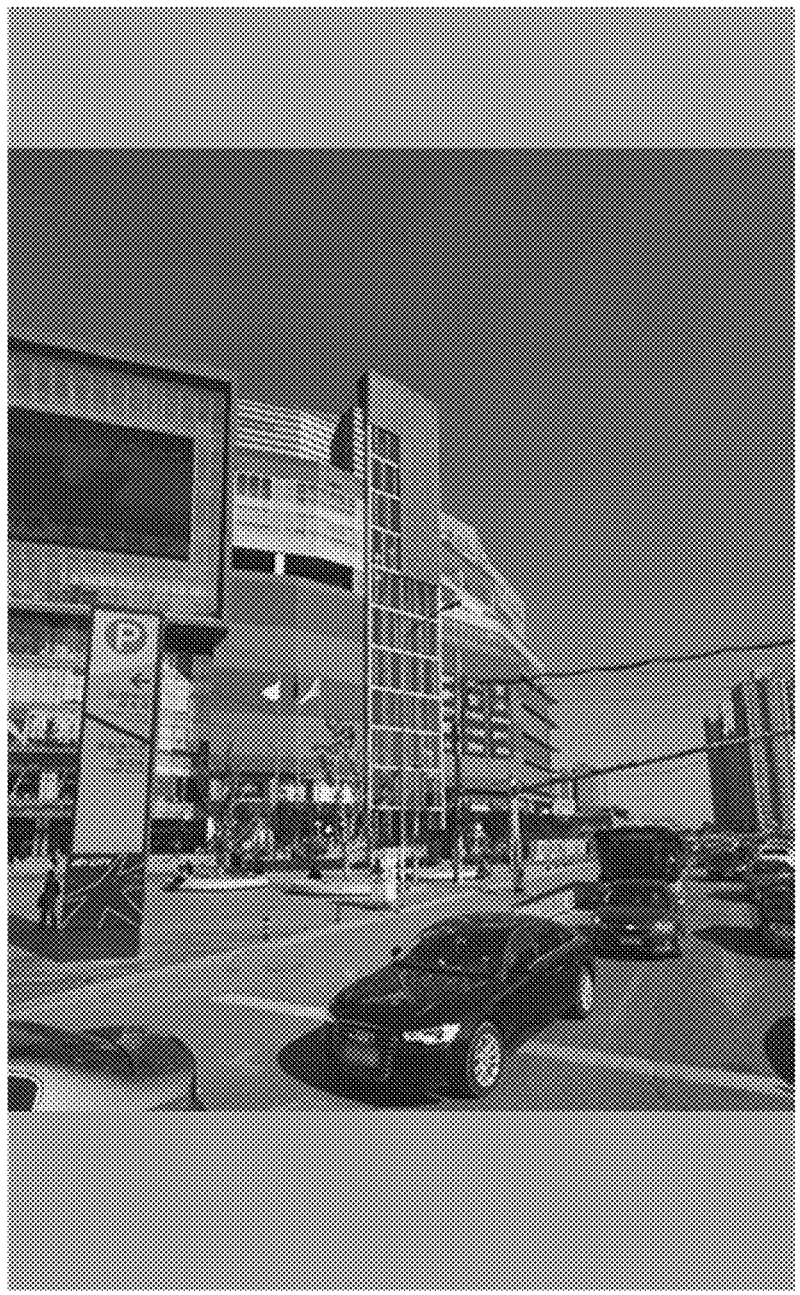
FIG. 3A is a schematic diagram of acquiring a real scenario image by using a camera of a mobile phone according to an embodiment of the present invention.

Referring to FIG. 3A, in this embodiment, a user may acquire image information of a real scenario by using a camera of a mobile phone, and display the image information on the display screen of the mobile phone.

S202: Determine, according to a current location and a device facing direction of the device, annotated information needing to be displayed.

In this embodiment, a GPS positioning apparatus and a sensor such as an accelerometer, a gyroscope, or an electronic compass may be disposed in the mobile phone in advance, so as to acquire a current location and a facing direction of the mobile phone, and further determine, according to the current location and the facing direction of the mobile phone, the annotated information needing to be displayed.

Figure 3B:
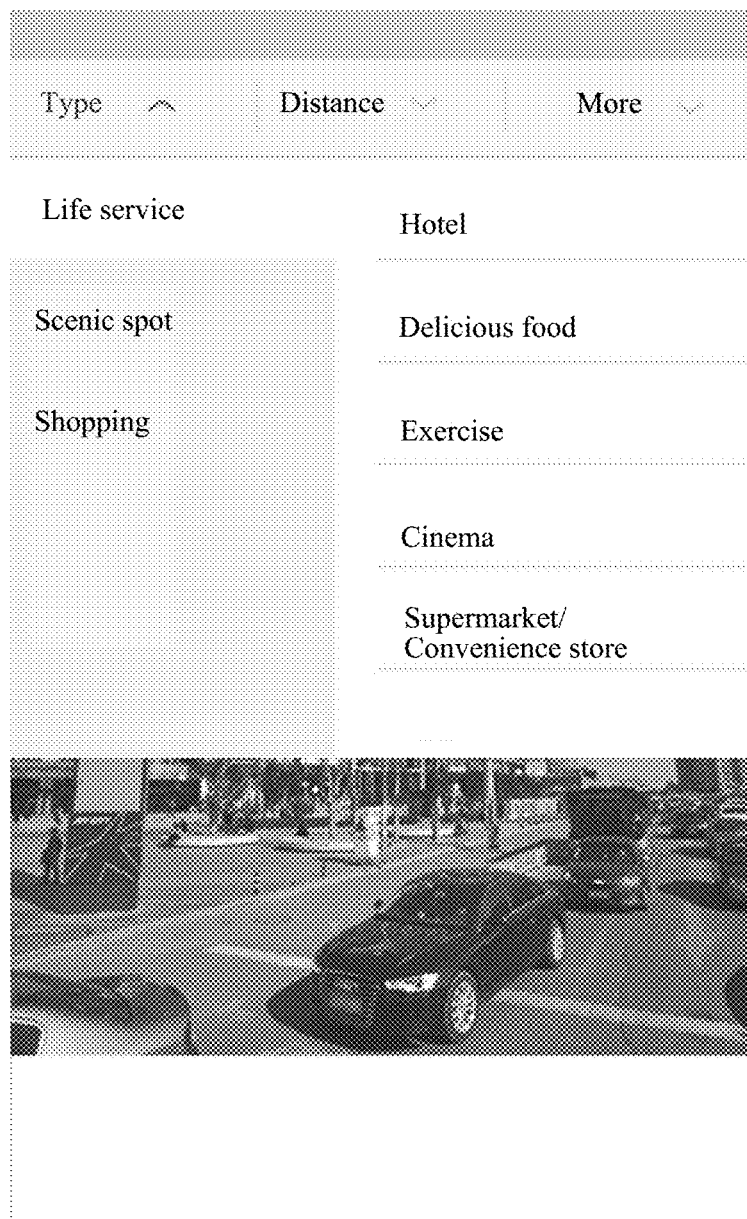
FIG. 3B is a schematic diagram of setting a policy for filtering out annotated information according to an embodiment of the present invention.

The user may set, in a setting interface, the annotated information needing to be displayed. For example, it may be set that only annotated information of a life service type is displayed, it may be set that only annotated information of a street view within 500 m from the current location is displayed, or the like. For a schematic diagram, reference may be made to FIG. 3B.

S203: Display the annotated information needing to be displayed and the real scenario image on the display screen of the device in an overlaid manner.

Figure 3C:
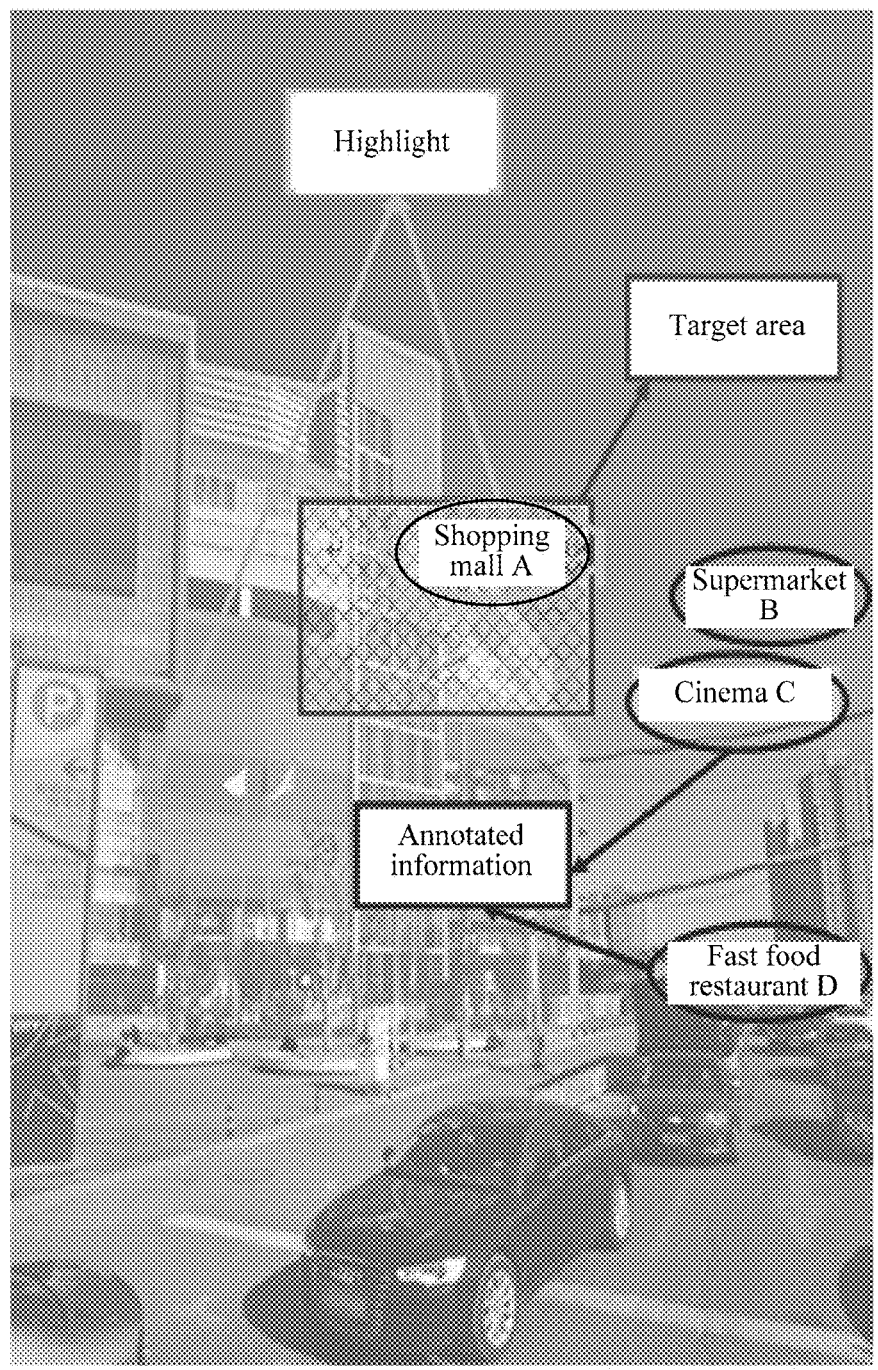
FIG. 3C is a schematic diagram of displaying annotated information needing to be displayed and a real scenario image on the display screen of a mobile phone in an overlaid manner by using an augmented reality technology according to an embodiment of the present invention.

Referring to FIG. 3C, in this embodiment, the annotated information needing to be displayed and the real scenario image may be displayed on the screen of the mobile phone in an overlaid manner by using an augmented reality technology. A target area is set on the screen of the mobile phone, and annotated information in the target area and a real scenario corresponding to the annotated information are highlighted.

It should be noted that after the annotated information needing to be displayed and the real scenario image are displayed on the display screen of the device in an overlaid manner, the annotated information displayed on the screen may be further filtered according to setting of the user, and for a filtering policy thereof, reference may be made to the policy for filtering out annotated information described in step S102.

S204: When it is detected that a time for which annotated information in a target area stays in the target area exceeds a threshold, determine that the annotated information is selected annotated information.

In this embodiment, the selected annotated information is determined in a manner in which when it is detected that the time for which the annotated information in the target area stays in the target area exceeds the threshold, it is determined that the annotated information is the selected annotated information. Assuming that the threshold is set to 2 s, when the mobile phone detects that annotated information enters the target area, and the time for which the annotated information in the target area stays in the target area exceeds 2 s, it is determined that the annotated information is the selected annotated information.

S205: Display a detail page of a street view corresponding to the selected annotated information.

Figure 3D:
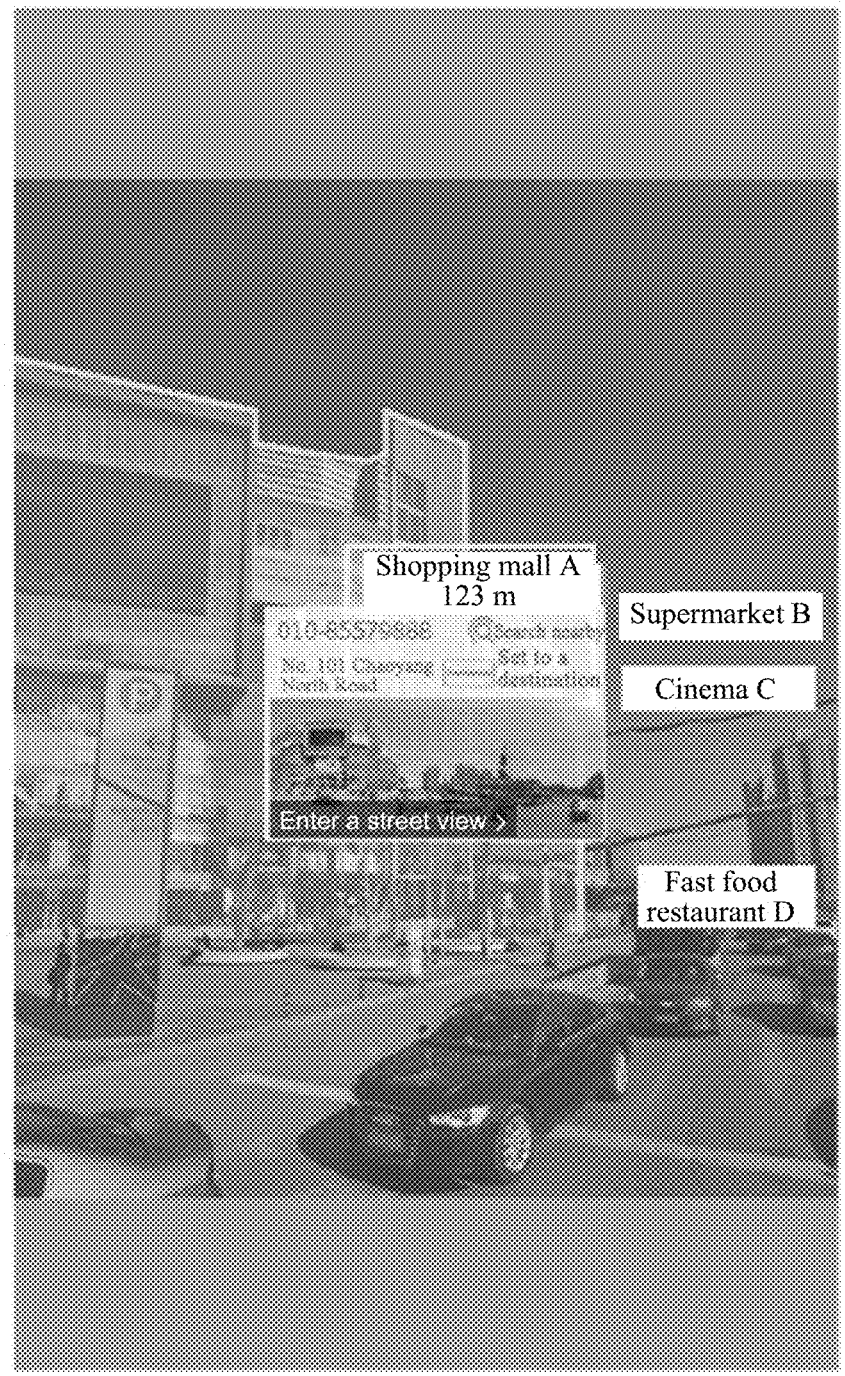
FIG. 3D is a schematic diagram of displaying a detail page of a street view corresponding to selected annotated information.

Referring to FIG. 3D, in this embodiment, after the selected annotated information is determined, the detail page of the street view corresponding to the selected annotated information may be displayed on the screen. The detail page may include information such as a street view thumbnail, address details, and a contact number, and the detail page includes a "setting as a destination" option. The user can view an optimal route from the current location to the street view destination by clicking on the "setting as a destination" option, where the optimal route may include an optimal walking route, an optimal route for a public transportation tool (for example, a bus or a subway), and an optimal route for a non-public transportation tool (for example, a self-driving car or a bicycle).

Figure 4:
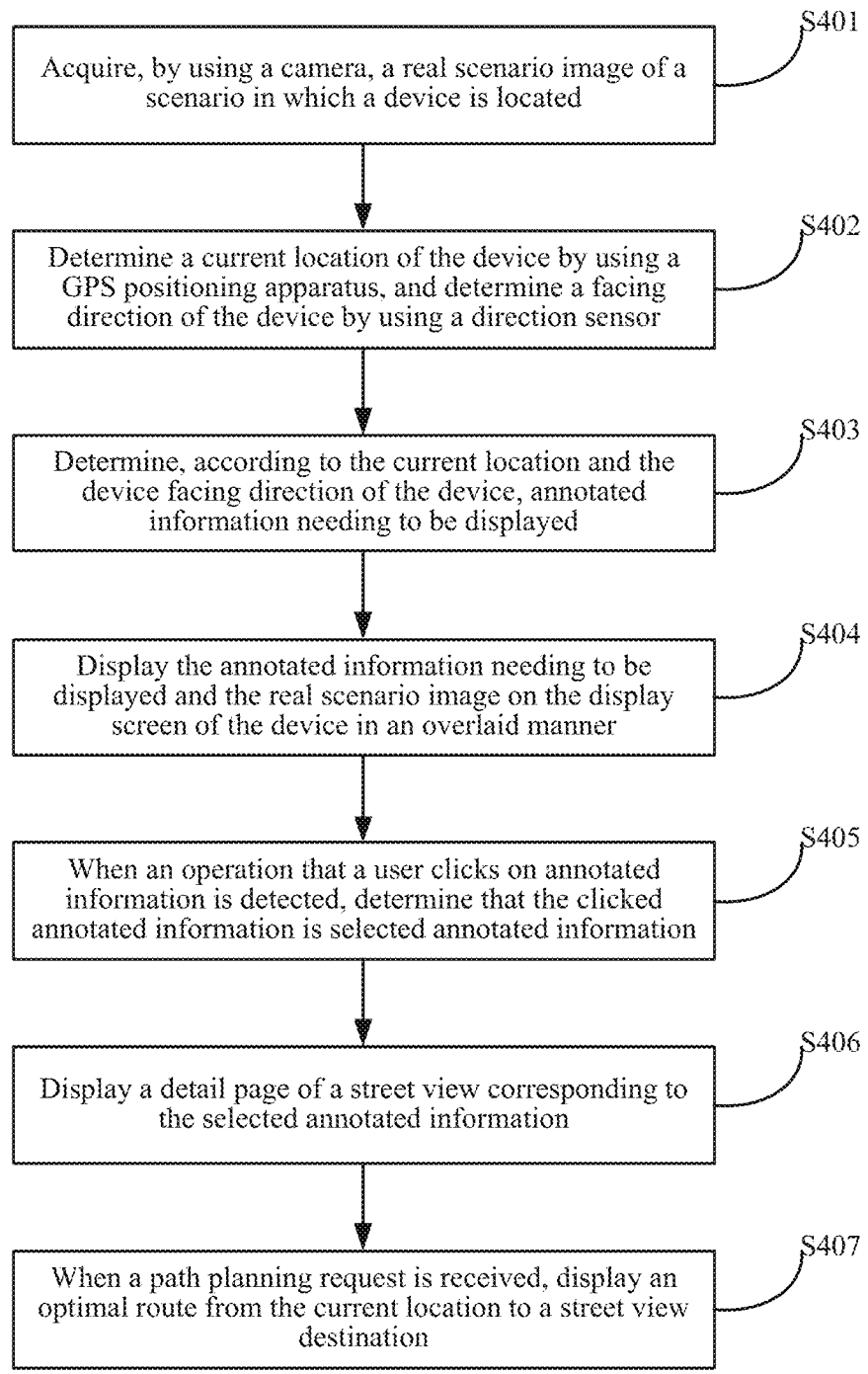
FIG. 4 is a schematic flowchart of another method for providing guidance to a street view destination according to an embodiment of the present invention.

Refer to FIG. 4, which is a schematic flowchart of another method for providing guidance to a street view destination according to an embodiment of the present invention. The method may include the following steps.

S401: Acquire, by using a camera, a real scenario image of a scenario in which a device is located.

S402: Determine a current location of the device by using a GPS positioning apparatus, and determine a facing direction of the device by using a direction sensor.

S403: Determine, according to the current location and the device facing direction of the device, annotated information needing to be displayed.

In this embodiment of the present invention, after annotated information corresponding to the current location and the device facing direction of the device is acquired, filtering on the annotated information may be performed according to a policy (where filtering may be performed according to types and/or distances), set by a user, for filtering out annotated information, and it is determined that annotated information obtained after the filtering is the annotated information needing to be displayed.

S404: Display the annotated information needing to be displayed and the real scenario image on the display screen of the device in an overlaid manner.

In this embodiment, the annotated information and the real scenario image may be displayed on the screen of the device by using an augmented reality technology.

S405: When an operation that a user clicks on annotated information is detected, determine that the clicked annotated information is selected annotated information.

S406: Display a detail page of a street view corresponding to the selected annotated information.

The detail page includes a "path planning" option. The user can view an optimal route from the current location to the street view destination by clicking on the "path planning" option.

S407: When a path planning request is received, display an optimal route from the current location to a street view destination.

The optimal route includes one or more of an optimal walking route, an optimal route for a public transportation tool, and an optimal route for a non-public transportation tool.

Based on the same technical idea as that in the foregoing method embodiments, an embodiment of the present invention further provides a device for providing guidance to a street view destination, where the device is applicable to the foregoing method embodiments.

Figure 5:
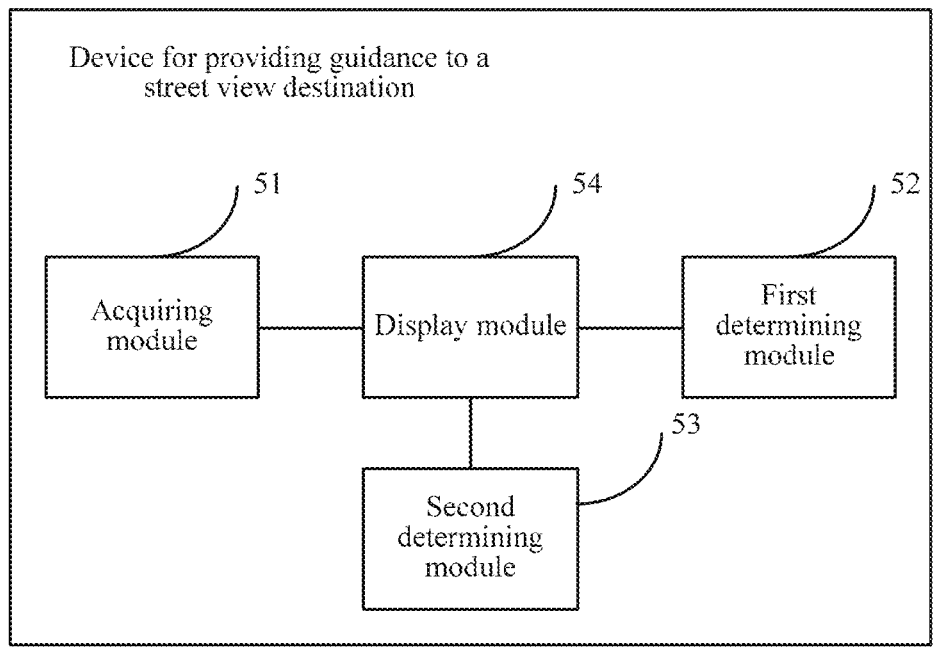
FIG. 5 is a schematic structural diagram of a device for providing guidance to a street view destination according to an embodiment of the present invention.

Refer to FIG. 5, which is a schematic structural diagram of a device for providing guidance to a street view destination according to an embodiment of the present invention. The device may include:

an acquiring module 51, configured to acquire a real scenario image of a scenario in which the device is located;

a first determining module 52, configured to determine, according to a current location and a device facing direction of the device, annotated information needing to be displayed;

a second determining module 53, configured to determine selected annotated information; and a display module 54, configured to display, in the real scenario image, the annotated information needing to be displayed; and display detailed information of a street view corresponding to the selected annotated information.

The acquiring module 51 may be configured to acquire, by using a camera of the device, the real scenario image of the scenario in which the device is located.

The display module 54 may be configured to display the annotated information needing to be displayed and the real scenario image on the display screen of the device in an overlaid manner.

When a target area is set on the display screen of the device:

the display module 54 may be further configured to: when annotated information appears in the target area, display in an emphasized manner (for example, highlighted, or displayed by performing magnification in a proportion) the annotated information and a real scenario corresponding to the annotated information.

Accordingly, the second determining module 53 may be configured to determine, when it is detected that a user clicks on annotated information, the annotated information that the user clicks on as the selected annotated information; or determine, when it is detected that a time for which annotated information in a target area stays in the target area exceeds a threshold, the annotated information as the selected annotated information; or determine, when it is detected that a user rocks the device, annotated information in a target area as the selected annotated information; or determine, when it is detected by using an eye tracking technology that a time for which a user stays on annotated information exceeds a threshold, the annotated information as the selected annotated information; or determine, when annotated information input by a user by using voice is detected, the annotated information as the selected annotated information.

The display module 54 may be configured to display a detail page of a street view corresponding to the selected annotated information.

The detail page includes: a street view thumbnail, address details, a contact number, and a distance.

The display module 54 may be further configured to display a corresponding street view panorama when it is detected that a user clicks on the street view thumbnail on the detail page.

The annotated information includes one or more pieces of the following: point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance.

Figure 6:
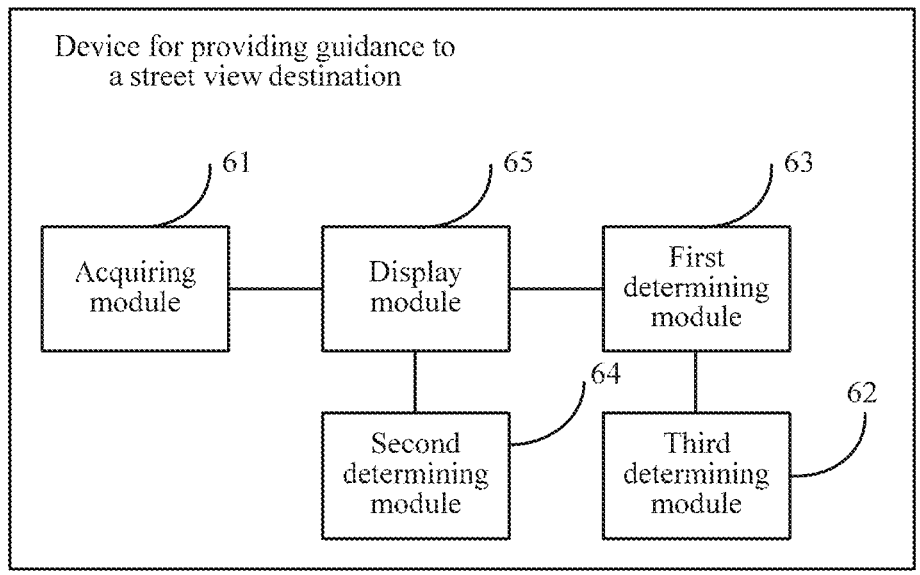
FIG. 6 is a schematic structural diagram of another device for providing guidance to a street view destination according to an embodiment of the present invention.

Refer to FIG. 6, which is a schematic structural diagram of another device for providing guidance to a street view destination according to an embodiment of the present invention. The device may include:

an acquiring module 61, configured to acquire a real scenario image of a scenario in which the device is located;

a third determining module 62, configured to determine a current location and a device facing direction of the device;

a first determining module 63, configured to determine, according to the current location and the device facing direction of the device, annotated information needing to be displayed;

a second determining module 64, configured to determine selected annotated information; and a display module 65, configured to display, in the real scenario image, the annotated information needing to be displayed; and display detailed information of a street view corresponding to the selected annotated information.

The third determining module may be configured to determine the current location of the device by using a global positioning system (GPS) positioning apparatus, and/or determine the device facing direction of the device by using a sensor, where the sensor includes an accelerometer, a gyroscope, and an electronic compass.

The annotated information includes one or more pieces of the following: point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance.

Figure 7:
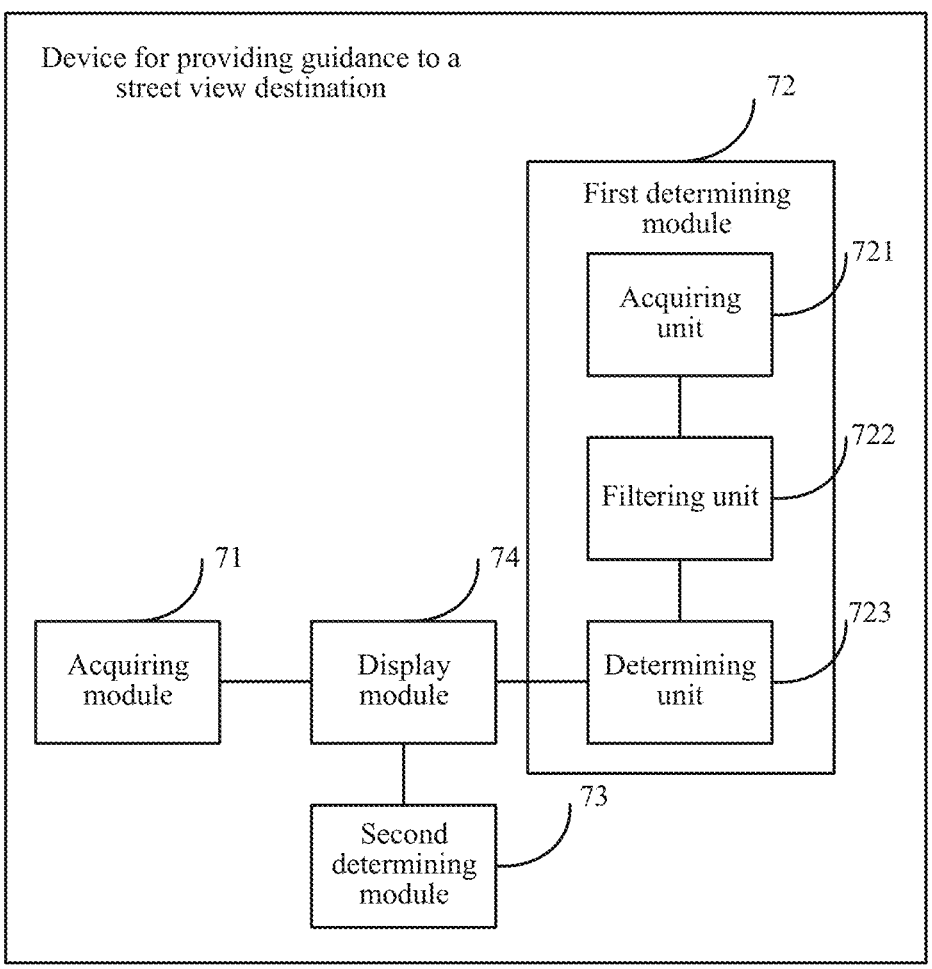
FIG. 7 is a schematic structural diagram of another device for providing guidance to a street view destination according to an embodiment of the present invention.

Refer to FIG. 7, which is a schematic structural diagram of another device for providing guidance to a street view destination according to an embodiment of the present invention. The device may include:

an acquiring module 71, configured to acquire a real scenario image of a scenario in which the device is located;

a first determining module 72, configured to determine, according to the current location and the device facing direction of the device, annotated information needing to be displayed;

a second determining module 73, configured to determine selected annotated information; and a display module 74, configured to display, in the real scenario image, the annotated information needing to be displayed; and display detailed information of a street view corresponding to the selected annotated information.

The first determining module 72 may include:

an acquiring unit 721, configured to acquire annotated information corresponding to the current location and the device facing direction of the device;

a filtering unit 722, configured to perform filtering on the acquired annotated information according to a policy for filtering out annotated information; and a determining unit 723, configured to determine that annotated information obtained after the filtering is the annotated information needing to be displayed.

The filtering unit 722 may be configured to perform filtering on the acquired annotated information according to types (for example, life services, scenic spots, and shopping) of real scenarios corresponding to the annotated information, and/or perform filtering on the acquired annotated information according to distances (for example, within 2 km, 1 km, or 500 m) from real scenarios corresponding to the annotated information to the current location of the device.

The annotated information includes one or more pieces of the following: point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance.

Figure 8:
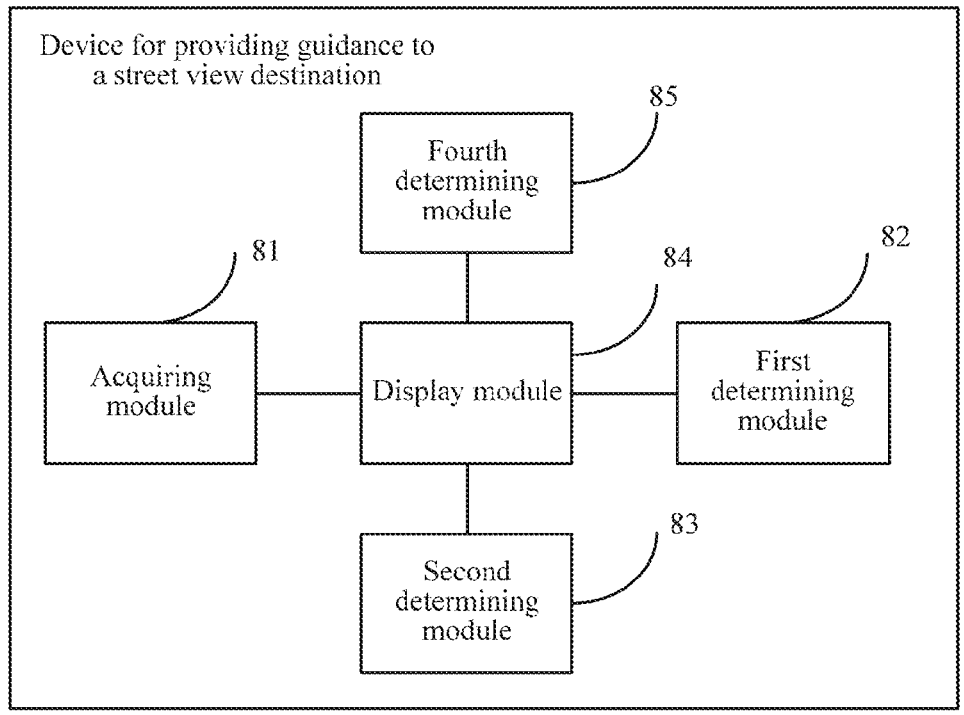
FIG. 8 is a schematic structural diagram of another device for providing guidance to a street view destination according to an embodiment of the present invention.

Refer to FIG. 8, which is a schematic structural diagram of another device for providing guidance to a street view destination according to an embodiment of the present invention. The device may include:

an acquiring module 81, configured to acquire a real scenario image of a scenario in which the device is located;

a first determining module 82, configured to determine, according to the current location and the device facing direction of the device, annotated information needing to be displayed;

a second determining module 83, configured to determine selected annotated information; and a display module 84, configured to display, in the real scenario image, the annotated information needing to be displayed; and display detailed information of a street view corresponding to the selected annotated information.

When a target area is set on the display screen of the device:

the display module 84 may be further configured to: when annotated information appears in the target area, display in an emphasized manner (for example, highlighted, or displayed by performing magnification in a proportion) the annotated information and a real scenario corresponding to the annotated information.

Accordingly, the second determining module 83 may be configured to determine, when it is detected that a user clicks on annotated information, that the annotated information that the user clicks on is the selected annotated information; or determine, when it is detected that a time for which annotated information in a target area stays in the target area exceeds a threshold, that the annotated information is the selected annotated information; or determine, when it is detected that a user rocks the device, that annotated information in a target area is the selected annotated information; or determine, when it is detected by using an eye tracking technology that a time for which a user stays on annotated information exceeds a threshold, that the annotated information is the selected annotated information; or determine, when annotated information input by a user by using voice is detected, that the annotated information is the selected annotated information.

Accordingly, the device for providing guidance to a street view destination provided in this embodiment of the present invention may further include:

a fourth determining module 85, configured to select, when more than one piece of annotated information appears in a target area, one piece of annotated information according to a preset rule, and determine that the one piece of annotated information is annotated information in the target area.

The fourth determining module 85 may be configured to determine that annotated information nearest to the central point of the target area is the annotated information in the target area; or select annotated information with a highest weight according to weights of the annotated information appearing in the target area, and determine that the annotated information is the annotated information in the target area; or randomly select one piece of annotated information, and determine that the one piece of annotated information is the annotated information in the target area.

The annotated information includes one or more pieces of the following: point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance.

Figure 9:
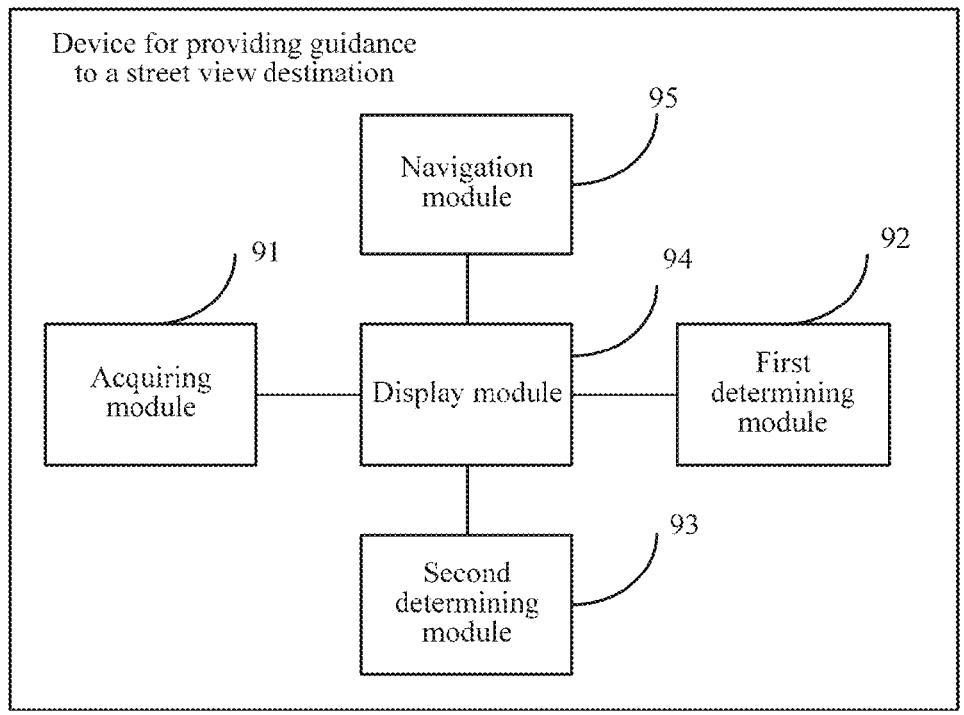
FIG. 9 is a schematic structural diagram of another device for providing guidance to a street view destination according to an embodiment of the present invention.

Refer to FIG. 9, which is a schematic structural diagram of another device for providing guidance to a street view destination according to an embodiment of the present invention. The device may include:

an acquiring module 91, configured to acquire a real scenario image of a scenario in which the device is located;

a first determining module 92, configured to determine, according to the current location and the device facing direction of the device, annotated information needing to be displayed;

a second determining module 93, configured to determine selected annotated information; and a display module 94, configured to display, in the real scenario image, the annotated information needing to be displayed; and display detailed information of a street view corresponding to the selected annotated information.

The display module 94 may be configured to display a detail page of a street view corresponding to the selected annotated information.

The detail page includes: a street view thumbnail, address details, a contact number, and a distance.

Accordingly, the display module 94 may be further configured to display a corresponding street view panorama when it is detected that a user clicks on the street view thumbnail on the detail page.

Accordingly, the device for providing guidance to a street view destination provided in this embodiment of the present invention may further include:

a navigation module 95, configured to determine an optimal route from the current location to the street view destination when a request for planning a path to the street view destination is received, where the optimal route includes one or more of the following: an optimal walking route, an optimal route for a public transportation tool, and an optimal route for a non-public transportation tool.

The annotated information includes one or more pieces of the following: point of interest (POI) information (for example, information such as a street view name, a street view type, a street view longitude, and a street view latitude), a street view thumbnail, nearby activity information (for example, a promotional activity, a concert of a star, and screening of a popular movie), an emergency (for example, a traffic accident), transportation information (for example, whether a road is smooth, and whether there is traffic control), and a distance.

It can be known from the foregoing description that in the technical solutions provided in the embodiments of the present invention, a solution for providing guidance to a street view destination is provided, where the solution has a more real visual effect and more scenario information. A user can intuitively compare displayed annotated information and a real scenario in front of a device, so as to find a destination street view. Because the destination street view is determined with reference to a current location and facing direction information of the device and a selection of the user, the destination street view better caters for actual need of the user, and street view guidance becomes more convenient, efficient, and targeted.

Persons of ordinary skill in the art may understand that all or a part of the processes of the methods in the embodiments may be implemented by a computer program instructing relevant hardware. The program may be stored in a computer readable storage medium and executed by one or more processors. When the program runs, the processes of the foregoing method embodiments are performed. The storage medium may include: a magnetic disk, an optical disc, a read-only memory (ROM), a random access memory (RAM), and the like.

The contents disclosed above are merely preferred embodiments of the present invention, but not intended to limit the scope of present disclosure. Persons of ordinary skill in the art can understand all or a part of the procedures for implementing the foregoing embodiments, and any equivalent variation made by them according to the claims of the present disclosure shall still fall within the scope of the present disclosure.

What is claimed is:

1. A method for providing guidance to a street view destination performed at an electronic device having one or more processors and a memory for storing programs to be executed by the processors, comprising:
    acquiring a real scenario image of a scenario in which a device is located;
    determining a current location and a device facing direction of the device;
    determining, according to the current location and the device facing direction of the device, annotated information needing to be displayed;
    displaying, in the real scenario image, the annotated information needing to be displayed;
    determining selected annotated information;
    displaying a detail page of a street view corresponding to the selected annotated information, wherein the detail page comprises a street view thumbnail; and
    displaying a corresponding street view panorama when it is detected that a user clicks on the street view thumbnail on the detail page.

2. The method according to claim 1, wherein the acquiring a real scenario image of a scenario in which a device is located comprises:
    acquiring, by using a camera of the device, the real scenario image of the scenario in which the device is located.

3. The method according to claim 1, wherein
    the current location of the device is determined by using a global positioning system (GPS) positioning apparatus, and the device facing direction of the device is determined by using a sensor, wherein the sensor comprises one or more of an accelerometer, a gyroscope, and an electronic compass.

4. The method according to claim 1, wherein the determining, according to the current location and the device facing direction of the device, annotated information needing to be displayed comprises:
    acquiring annotated information corresponding to the current location and the device facing direction of the device;
    performing filtering on the acquired annotated information according to a policy for filtering out annotated information; and
    determining that annotated information obtained after the filtering is the annotated information needing to be displayed.

5. The method according to claim 4, wherein the performing filtering on the acquired annotated information according to a policy for filtering out annotated information comprises:
    performing filtering on the acquired annotated information according to types of real scenarios corresponding to the annotated information; and/or
    performing filtering on the acquired annotated information according to distances from real scenarios corresponding to the annotated information to the current location of the device.

6. The method according to claim 1, wherein the displaying, in the real scenario image, the annotated information needing to be displayed comprises:
    displaying the annotated information needing to be displayed and the real scenario image on the display screen of the device in an overlaid manner.

7. The method according to claim 6, wherein when a target area is set on the display screen of the device, the method further comprises:
    displaying, in an emphasized manner, annotated information in the target area and a real scenario corresponding to the annotated information.

8. The method according to claim 1, wherein the determining selected annotated information comprises:
    determining, when it is detected that a user clicks on annotated information, the annotated information that the user clicks on as the selected annotated information.

9. The method according to claim 1, wherein the determining selected annotated information comprises:
    determining, when it is detected that a time for which annotated information in a target area stays in the target area exceeds a threshold, that the annotated information is the selected annotated information.

10. The method according to claim 1, wherein the determining selected annotated information comprises: determining, when it is detected that a user rocks the device, that annotated information in a target area is the selected annotated information.

11. The method according to claim 1, wherein the determining selected annotated information comprises:
determining, when it is detected by using an eye tracking technology that a time for which a user stays on annotated information exceeds a threshold, that the annotated information is the selected annotated information.

12. The method according to claim 1, wherein the determining selected annotated information comprises:
determining, when annotated information input by a user by using voice is detected, that the annotated information is the selected annotated information.

13. The method according to claim 1, wherein the method further comprises:
selecting one piece of annotated information according to a preset rule when more than one piece of annotated information appears in a target area, and determining that the one piece of annotated information is annotated information in the target area.

14. The method according to claim 13, wherein the selecting one piece of annotated information according to a preset rule, and determining that the one piece of annotated information is annotated information in the target area comprises:
determining that annotated information nearest to the central point of the target area is the annotated information in the target area.

15. The method according to claim 13, wherein the selecting one piece of annotated information according to a preset rule, and determining that the one piece of annotated information is annotated information in the target area comprises: selecting annotated information with a highest weight according to weights of the annotated information appearing in the target area, and determining that the annotated information is the annotated information in the target area.

16. The method according to claim 13, wherein the selecting one piece of annotated information according to a preset rule, and determining that the one piece of annotated information is annotated information in the target area comprises: randomly selecting one piece of annotated information, and determining that the one piece of annotated information is the annotated information in the target area.

17. The method according to claim 1,
wherein the detail page further comprises: address details, a contact number, and a distance.

18. The method according to claim 17, after the displaying detailed information of a street view corresponding to the selected annotated information, further comprising:
determining an optimal route from the current location to the street view destination when a request for planning a path to the street view destination is received, wherein the optimal route comprises one or more of the following: an optimal walking route, an optimal route for a public transportation tool, and an optimal route for a non-public transportation tool.

19. The method according to claim 1, wherein the annotated information comprises one or more of the following: point of interest (POI) information, a street view thumbnail, nearby activity information, an emergency, transportation information, and a distance.

20. An electronic device for providing guidance to a street view destination, comprising:
one or more processors;
memory; and
one or more programs stored in the memory and to be executed by the processors, the programs further including instructions for:
acquiring a real scenario image of a scenario in which a device is located;
determining a current location and a device facing direction of the device;
determining, according to the current location and the device facing direction of the device, annotated information needing to be displayed;
displaying, in the real scenario image, the annotated information needing to be displayed;
determining selected annotated information;
displaying a detail page of a street view corresponding to the selected annotated information, wherein the detail page comprises a street view thumbnail; and
displaying a corresponding street view panorama when it is detected that a user clicks on the street view thumbnail on the detail page.

* * * * *